No. 647,741. Patented Apr. 17, 1900.
F. BEDELL.
SYSTEM OF ELECTRICAL TRANSMISSION.
(Application filed Jan. 31, 1900.)
(No Model.) 3 Sheets—Sheet 1.

Witnesses: Raphael Netter, L. T. Shaw

Frederick Bedell, Inventor
by E. M. Bentley, Att'y

No. 647,741.  
F. BEDELL.  
SYSTEM OF ELECTRICAL TRANSMISSION.  
(Application filed Jan. 31, 1900.)  
Patented Apr. 17, 1900.

(No Model.)  
3 Sheets—Sheet 3.

Witnesses:  
Raphaël Netter  
L. T. Shaw

Frederick Bedell Inventor  
by E. M. Bentley Att'y.

UNITED STATES PATENT OFFICE.

FREDERICK BEDELL, OF ITHACA, NEW YORK.

SYSTEM OF ELECTRICAL TRANSMISSION.

SPECIFICATION forming part of Letters Patent No. 647,741, dated April 17, 1900.

Application filed January 31, 1900. Serial No. 3,417. (No model.)

*To all whom it may concern:*

Be it known that I, FREDERICK BEDELL, a citizen of the United States, residing at Ithaca, county of Tompkins, State of New York, have invented certain new and useful Improvements in Systems of Electrical Transmission, of which the following is a specification, reference being made to the accompanying drawings.

My invention relates to certain improvements and extensions of the system embodied in my application for patent, Serial No. 722,799, filed July 5, 1899. In that system I provided means for transmitting electric currents of differing character over the same line conductors for use in electrical-transmission systems.

First. My present invention involves means for adjusting the currents and potentials derived from the separate sources, and relates more particularly to means for adjusting the division of a second current between coils connected to the conductors of an alternating-current system and for adjusting the potentials of the points of said system at which the second current is introduced and withdrawn.

Second. It involves also the application of my aforesaid system to multiphase coils, so that a second current may be introduced into and withdrawn from any multiphase alternating-current distributing system.

My invention furthermore involves means for utilizing an alternating-current multiphase generator and an alternating-current motor as the agencies for introducing or withdrawing the second current into or out from a multiphase system of alternating-current distribution.

Third. It involves also means for starting a rotary converter and for applying the direct current generated by the armature of said converter to conductors of the same distributing system from which the alternating currents are supplied thereto.

It likewise involves means for deriving direct and alternating current from the same armature wound as the armature of a rotary converter and in a similar manner distributing both kinds of current over the same distributing-conductors according to my fundamental invention.

Fourth. It also involves means for connecting together two circuits, one alternating and one direct, and utilizing the two in combination according to my fundamental invention as portions of a third and practically-independent circuit having its own transmitting and receiving apparatus of any desired character.

It likewise involves means for applying my invention in this manner when the two circuits, alternating and direct, are derived from the same generator.

Fifth. It involves means for the repeated application of my invention in the same system, whereby the conductors of any system of distribution may be used jointly as a single conductor to form part of any number of circuits, each with its own generating and receiving apparatus and independent of the other circuits.

Sixth. Finally, I include in my invention the various details of the aforesaid improvements and all of the specific devices herein illustrated and described.

Referring to the accompanying drawings, Figs. 4 to 15, inclusive, illustrate different arrangements of the second portion of my invention. Figs. 16 and 17 illustrate the third portion of my invention.

Figure 1:
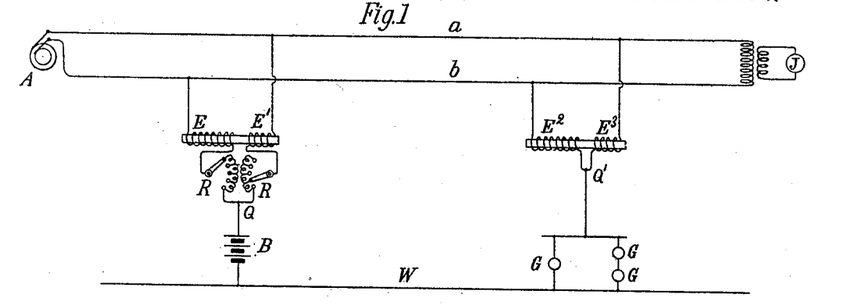
Figures 1, 2, and 3 illustrate means which may be employed in carrying out the first portion of my invention.

Turning to Fig. 1, A represents an alternating-current generator supplying a system of distribution by the line conductors $a$ and $b$, the receiving apparatus being indicated at J as included in the secondary circuit of a transformer whose primary is connected to $a$ and $b$. Into this alternating circuit it is desired to introduce a second current on the principle of my fundamental invention aforesaid, and this second current may be of any desired character and either alternating or direct.

In Fig. 1 I show the means for introducing a direct current into the alternating-current circuit by applying one terminal of a direct-current generator to an intermediate point in a coil connected across between the mains $a$ and $b$. In like manner the direct current is to be withdrawn from the said alternating circuit at a distant point by a connection from a similar intermediate point in a coil connected across the mains $a$ and $b$.

In my present device, E and E' represent the two portions of a coil through which the direct current is to be applied. In the former application for patent aforesaid these two coils were equal in number of turns, and the two branch circuits for the direct current, including the aforesaid coils, lines, and receiving-coils, were substantially equal in resistance, so as to obtain an equal division between them of the direct current to neutralize its magetizing effect on the core of the coils, this being of special importance when the same are to be used as a transformer. In this manner the application and withdrawal of direct current at points of equal potential between the mains $a$ and $b$ was accomplished. In the present case, however, the two coils E and E' are of different dimensions, the former having, for example, twice the number of turns found in the latter. In this case I apply the direct current to a point intermediate to the said coils, but insert adjustable resistance R R, by means of which I may adjust to their respective number of turns the amount of direct current flowing in the respective coils E E'.

B represents a direct-current generator, and Q is the terminal, connected to the alternating coils aforesaid.

W is the ground or return conductor for the direct current. At the receiving end there are two coils $E^2$ and $E^3$, which are also unequal in character, corresponding to the coils E and E'. The adjustment afforded by the resistances R R will cause a like adjustment in the portion of direct current received by the coils $E^2$ and $E^3$, which are connected at the intermediate point Q' to the direct-current translating devices G G, which in turn are connected to the ground or return wire W. It is not necessary in all cases that the resistance R R should be used, since the internal resistance of the alternating coils and of the line conductors may be such that the lesser current in the larger coil may give approximately the same number of ampere-turns as the greater current in the smaller coil.

Figure 2:
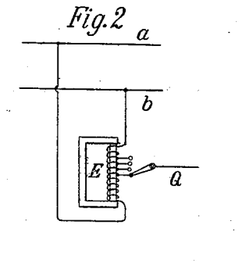

In Fig. 2 I have shown another means of adjustment by applying the direct-current terminal Q adjustably to different portions of an alternating coil E. By this means the potential of the point Q and the division of current through the two parts of coil E may be adjusted and the same equalization just described may be attained.

Figure 3:
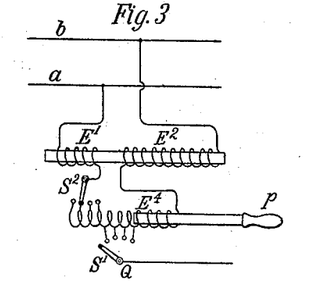

In Fig. 3 I have shown still another method of adjustment, which involves the use of an intermediate coil $E^4$ between the terminal Q and the alternating coils E' and $E^2$. This coil $E^4$ is divided in sections and a switch S' is provided for applying the terminal Q to different portions of the coil, as in the arrangement of Fig. 2. A similar switch $S^2$ is employed to give the terminal of coil E' the same adjustable connection to the sectional coil $E^4$. The coil $E^4$ has, moreover, an adjustable iron core P, whereby any desired portion of the coil may be made inductive by the presence of the iron and the remaining portion left comparatively non-inductive in character. The two terminals of coil $E^4$ will be connected, respectively, to the inner terminals of the coils E' and $E^2$. By this means I am enabled not only to adjust the resistance with relation to the application of the direct current, but also to adjust the inductive reactions in the coils E' and $E^2$, whereby the alternating potential of the point Q may be given a desired value.

The above-described devices for adjusting the division of the direct current and for the inductive adjustment of the alternating current are merely illustrative of devices which I may employ in carrying out this part of my invention.

It is to be understood that I do not limit myself to the devices shown, but may employ any means for obtaining any desired adjustment, according to the character of the currents employed. Furthermore, such adjustments are in no wise limited to the case illustrated in Fig. 1, where for simplicity I have shown a simple single-phase line and one receiving-point Q' for deriving current from the source through the lines $a$ and $b$. Obviously there may be any number of receiving-stations corresponding to the point Q', and these may be located as desired. It is likewise to be understood that devices for adjusting currents and potentials may be employed in the application of my invention to multiphase circuits or in any application of my invention where such adjustments are desirable.

The second part of my invention may be next described.

Figure 4:
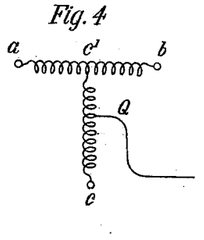

Fig. 4 shows the method of applying a direct or other second current to multiphase coils, the coils in Fig. 4 being T-connected three-phase coils having the terminals $a$, $b$, and $c$. The terminal Q is tapped in at an intermediate point in the coil $c\ c'$, this intermediate point being chosen so that the direct current from Q will so divide as to flow equally from the terminals $a$, $b$, and $c$ to the lines connected thereto. Thus if three amperes are delivered at Q the resistance of the line conductors and coils will be such as to deliver one ampere at the point $c$, while two amperes will pass to the horizontal coil, and there, dividing equally, one ampere will appear at $a$ and one at $b$. By proper adjustment the ampere-turns in the two portions of each coil will be the same with respect to the direct current delivered thereto, and, in the manner already described, the direct current will pass without interference with the alternating current to the three line-wires of the alternating system and at a distant point may be withdrawn therefrom by a similar or other preferred arrangement. The location of Q as above described possesses the additional advantage that it may be made the neutral point of the three-phase system.

Figure 5:
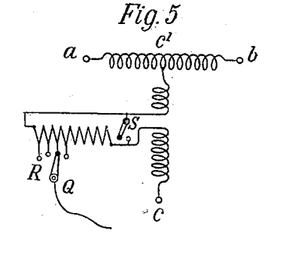

In Fig. 5 there is shown substantially the same arrangement as in Fig. 4 except that the terminal Q is connected into the vertical coil through adjustable resistance R, as in the arrangement of Fig. 1, there being also provided a switch S, which may short-circuit the resistances when desired. Increased efficiency may be thus obtained by cutting out the resistances when no current is being introduced or withdrawn at Q. I commonly prefer the equal division of current to the terminals $a\ b\ c$, as described in connection with Fig. 4; but when a different division is desired this may be obtained by adjusting the resistance of the coils, of the line conductors, and of the resistance R, with a corresponding adjustment of the number of turns in the several portions of the coils.

Figure 6:
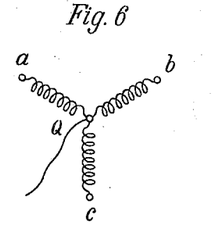

In Fig. 6 I have shown the three Y-connected coils of a translating apparatus with the terminal Q connected directly to the neutral point, an arrangement which may be employed in certain cases. In Fig. 7, however, I have shown added to this arrangement a series of three small supplementary coils corresponding, respectively, to the three coils of the translating device and wound upon the same core. These supplementary coils are connected in series, and the direct current passes through them before reaching the terminal Q, which, as described, is applied to the neutral point. By this means the magnetizing effect of the direct current on each of the three branches of the alternating coils may be neutralized. When three Y-connected transformers are employed, as shown in Fig. 7, the supplementary coils may be used as secondaries (or parts of secondaries) and deliver alternating current independent of the direct current to suitable translating devices.

In Fig. 8 the terminal Q is shown connected to the neutral point of balanced two-phase coils in the same way as it was connected to the neutral point of three-phase coils in Fig. 6, the second current dividing differentially to $a$ and $b$ and to $c$ and $d$, respectively.

Figure 9:
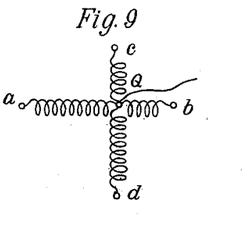

In Fig. 9 the terminal Q is connected unsymmetrically to two two-phase coils, the point of application in each coil being adjusted with relation to the resistances of the circuit and coils to secure practically the same number of ampere-turns of direct current in the two portions of each alternating coil. If desired, this point of application may be adjusted in the manner described in connection with Figs. 1, 2, 3, and 5.

Figure 10:
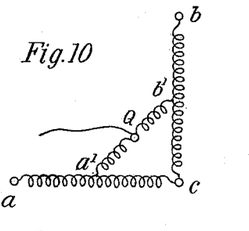
Figures 11, 12, 13, 14, 15, 16:
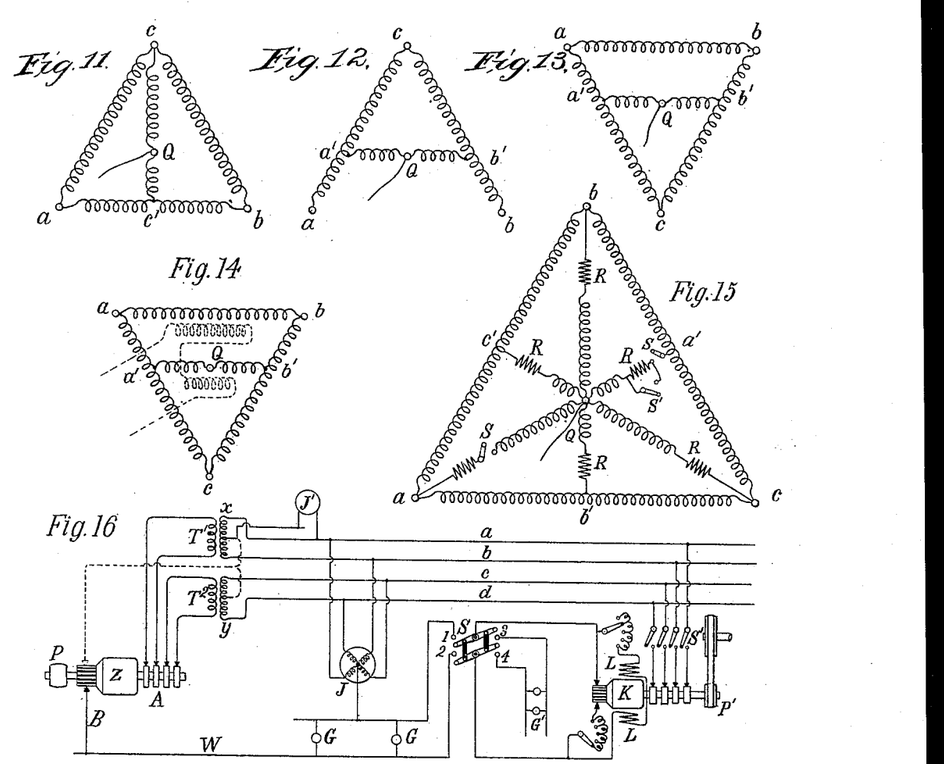

In Fig. 10 there are illustrated coils arranged for connection to a two-phase three-wire system, coil $a\ c$ being for one phase and coil $b\ c$ for the other. In this case the terminal Q is applied to an intermediate point of a bridging-coil connecting the points $a'$ and $b'$ of the respective alternating coils. In this way the magnetizing effect of the direct current will be neutralized in the manner already described. In Fig. 11 I have shown a similar bridging-coil applied to delta-connected three-phase coils. In this case the bridging-coil spans from the terminal $c$ to a point $c'$ midway between the terminals $a$ and $b$. The terminal Q is preferably connected to the point of the bridging-coil which is the neutral point of the three-phase system, so that there is the same alternating difference of potential between Q and each terminal $a\ b\ c$ with or without adjustable resistances, so that the direct current will be equally divided at the points $a$, $b$, and $c$, and the magnetizing effect of the direct current will be neutralized, as in the arrangement shown in Fig. 4. The point Q may be located unsymmetrically, as described in connection with Fig. 5.

In Fig. 12 I have shown a new arrangement of three-phase coils, which may be termed an A connection. In this case the base of ordinary delta-connected coils is moved up to join the points $a'$ and $b'$ one-third of the distance from the points $a$ and $b$ to the apex $c$. The terminal Q is applied neutrally in the bridging-coil, so that the direct current will divide equally through the two portions thereof, and from the points $a'$ and $b'$ two-thirds of the current will pass to respective points $a$ and $b$ and one-third to the apex $c$; but the greater number of turns in the longer portions of the coils will give an equal number of ampere-turns in the longer and shorter portions.

In Fig. 13 I have shown ordinary delta-connected coils with the addition of the same bridge between the points $a'$ and $b'$ that appears in Fig. 12.

In Fig. 14 transformer-coils are shown arranged in the same manner as the coils in Fig. 13; but in addition secondary coils are applied to the two horizontal coils, as shown by the dotted lines, and may be connected either in series or in parallel to any desired translating apparatus.

The A arrangement shown in Fig. 12 and its modifications shown in Figs. 13 and 14 and likewise the bridge shown in Fig. 11 are not limited in usefulness to alternating-current circuits where a second current is transmitted. They afford a convenient means for obtaining the neutral point of a multiphase system for grounding or other purposes, a point which cannot be obtained from the ordinary delta connection.

In Fig. 15 delta-connected coils are shown with the terminal Q connected to different parts thereof through adjustable resistances and intermediate coils of differing resistance and turns. Thus the terminal Q is connected not only to the points $a$, $b$, and $c$, but also to the points $a'$, $b'$, and $c'$, an appropriate resistance, coil, or both, being inserted in each radiating branch. All or a portion of these branches may be used, according to desired condition. By switches S S any coils may be disconnected, and any resistance may be short-circuited by a switch, as S'.

The variously-arranged alternating-current coils thus far described, and illustrated in Figs. 1 to 15, may be elements of inductive apparatus of any character. When transformer-coils are so employed, I commonly prefer that the intermediate point Q be the neutral point of the system, that the second current divide, so as to flow equally over the several line conductors, and that the magnetizing effect of the second currents is substantially neutralized by the differential arrangement of ampere-turns, this last feature being particularly important in transformers when a large direct current is employed as the second current. As has already been pointed out, these features are subject to modification when desired. When the coils of a motor, generator, or rotary are employed for the purposes described, these features may likewise be modified as occasion requires. Thus the differential effect may be retained to a greater or lesser degree, as desired, according to the most desirable saturation of the iron. For example, by properly proportioning the number of turns and the resistances of the several coils and circuits in the manner already described the iron of an armature may be given any desired magnetic saturation affecting to a corresponding extent the armature reaction and inductance.

The use of the coils of a motor as alternating coils in which a second current may be introduced or withdrawn will be described in connection with Fig. 16, and the use of a generator-armature for the same purpose will be described in connection with Fig. 17.

Turning next to Fig. 16, the third portion of my invention will be described. In this figure, Z represents a Siemens armature driven by a pulley P, with a direct current derived from its commutator B in the usual manner. At A are four contact-rings, connected at different points of the winding, from which rings two-phase alternating currents are taken in a well-known manner. T' is a transformer for one phase, and $T^2$ is a transformer for the other phase. One terminal of the direct current from commutator B is connected to the intermediate points $x$ and $y$ of both secondaries of the transformers T' and $T^2$. In this manner the direct current is divided equally between the four line-wires $a$, $b$, $c$, and $d$ of the two-phase system. J at a receiving-station is a two-phase motor, and from the neutral point of the motor-circuits a direct current is taken according to the arrangement in Fig. 8. This direct current is utilized to supply the lamps G G or other direct-current translating devices, which in turn are connected to the ground or return wire W, leading back to the commutator B. I have also found that it is possible to include alternating-current apparatus at the point J', connected between the line-wire $a$ and the applied direct-current terminal. This alternating receiving device will be operated by that portion of the secondary of transformer T' included between the line $a$ and the direct-current terminal. In a similar manner any unsymmetrical or unbalanced alternating-current load may be thrown upon any part of the system without detriment. At the right of the figure, K is a rotary converter which it is desired to start by means of a direct current. For this purpose the switches S' are turned to disconnect the alternating end of the converter and the switch S is turned to connect the direct-current end of the converter to the terminals 1 and 2 of the direct-current system derived from the two-phase motor J or from any other suitable inductive apparatus adapted to draw direct current from alternating mains. The switch S will thus admit direct current to the rotary converter, both armature and field L, through suitable adjusting-switches, and the converter will then start into operation as a direct-current motor. When it has attained its speed, the switches S and S' will be thrown, the former to disconnect the direct starting-current and connect in the translating devices G', having the terminals 3 and 4, to the direct-current end of the converter. The switch S' will connect the alternating currents to the opposite end of the converter to keep it in operation. The pulley P' may deliver power to any desired apparatus.

Figure 17:
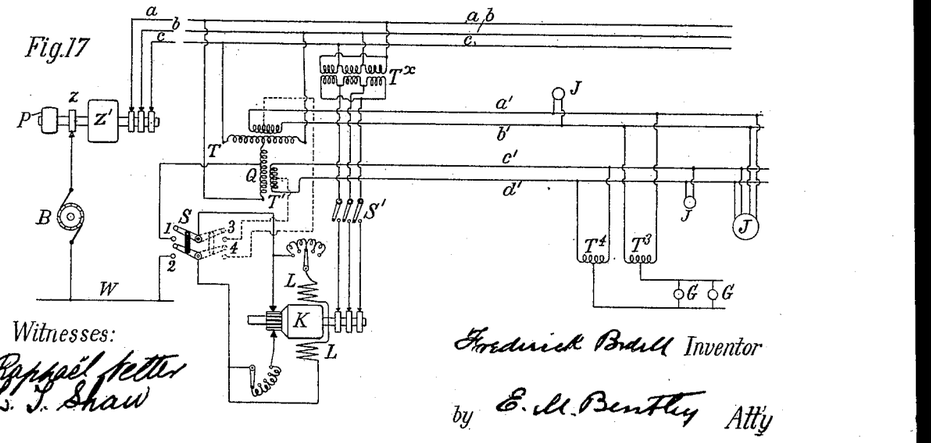

Turning next to Fig. 17, Z' represents a three-phase alternating-current armature having direct current from the generator B introduced through the contact-ring $z$ to the alternating-current winding at the neutral point or in any of the ways shown in Figs. 4 to 7 and 11 to 15. The opposite terminal of generator B is connected to ground or return line W. The three line-wires $a$, $b$, and $c$ are the primary line-wires of a three-phase system of distribution. Leads from these three wires are taken to T-connected transformers T and T', from the secondaries of which two-phase currents are derived in a well-known manner and transmitted by the four line-wires $a'$, $b'$, $c'$, and $d'$, which form a secondary or low-potential system of distribution. The direct-current terminal Q is connected at an intermediate point of the primary coil of the transformer T' according to the method shown in Fig. 4. The direct current is then utilized to start the rotary converter K in the same manner as was just described in connection with Fig. 16. After the converter is started, however, the switch S is opened and the switch S' closed, the converter then being driven by alternating current derived from the delta-connected transformers $T^\times$, whose primaries are connected to the primary mains $a\,b\,c$. Its direct-current end is then connected by the switch S to the terminals 3 and 4, which in this case lead, respectively, to the intermediate points of the two secondary coils of transformers T and T'. In this way the alternating lines $a'$ and $b'$ will form a joint conductor for one terminal of the direct current and the alternating lines $c'$ and $d'$ will form the opposite joint conductor. At the same time these four conductors will be delivering alternating currents to alternating-current apparatus, (indicated at J J J.) The direct current will be withdrawn from these lines according to the method of my fundamental invention by means of transformers or coils $T^3$ and $T^4$, which are connected, respectively, to the two-phase conductors $a'$ $b'$ and $c'$ $d'$, while the direct-current leads will be taken from their intermediate points, as shown, and used to supply translating devices G G.

The use of a common armature with a single winding, with commutator and collector rings connected thereto, for direct and alternating currents, respectively, the commutator and collector rings being likewise connected to conductors of the same distributing system for the joint distribution of direct and alternating current, forms a part of my invention. Such an armature, which has just been described in connection with the converter K in Figs. 16 and 17, has likewise been shown as the armature Z in Fig. 16. Referring to Fig. 16, the relation between the generator Z and converter K, each with the above-described type of armature, may be reversed. Thus K may be driven as a generator by the pulley P', furnishing both direct and alternating currents, the former being available at B and the latter at A. By means of suitable switching and starting devices, as shown in connection with K and already described, Z may now be operated as a rotary converter, being brought to speed by direct current delivered at the commutator end B and then being operated by alternating currents delivered at the collector-rings A. The machine Z, which is now being operated as a synchronous motor or rotary converter, may deliver direct current from the commutator B or mechanical power from the pulley P. Such a machine, as K or Z, is capable of receiving energy in any one of the three forms—first, mechanical power; second, direct current, or, third, alternating current—and of delivering energy in either or both of the other two forms. I have also found that such a machine may receive energy in any two forms simultaneously and deliver energy in the third form. Thus by proper arrangement of ratios and voltages I have been able to supply simultaneously to such a machine both direct and alternating currents and derive mechanical power therefrom.

Figure 18:
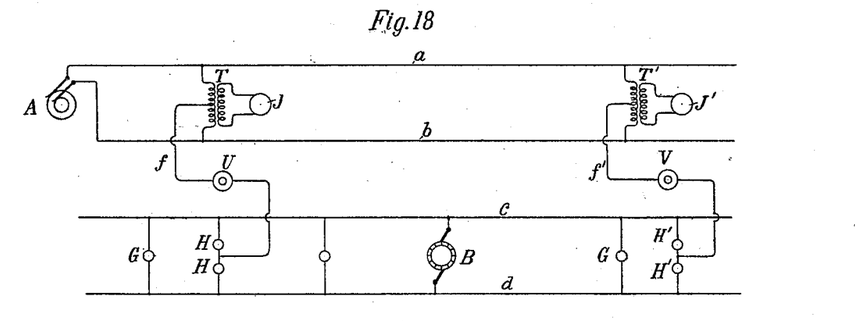
Figs. 18 and 19 illustrate the fourth portion of my invention.

In Fig. 18 I have shown still another application of my invention. In this case B is a direct-current generator delivering current to the translating devices G G, H H, and H' H', while A represents an alternating-current generator delivering current to the transformers T T' to operate alternating translating devices at J J'. Anywhere along these two lines I connect a third wire $f$, one terminal of which is connected to an intermediate point of a coil or transformer T on the alternating-current system, and the other terminal is connected between two translating devices H H on the direct-current system. In this line $f$ I place any kind of generator U. In a like manner suitable receiving apparatus V is included in the line $f'$, whose terminals are respectively connected to intermediate points in transformer T' and between the translating devices H' H'. The generator or receiver may be operated quite independently of either the direct or alternating systems for transmitting and receiving current of any character. I thus have practically a third circuit which may be used independently, although connected at its respective ends with the alternating and direct current systems aforesaid. The two conductors $c$ and $d$ of the direct-current circuit act jointly as a single conductor for the third current from the generator U, according to my fundamental invention.

Figure 19:
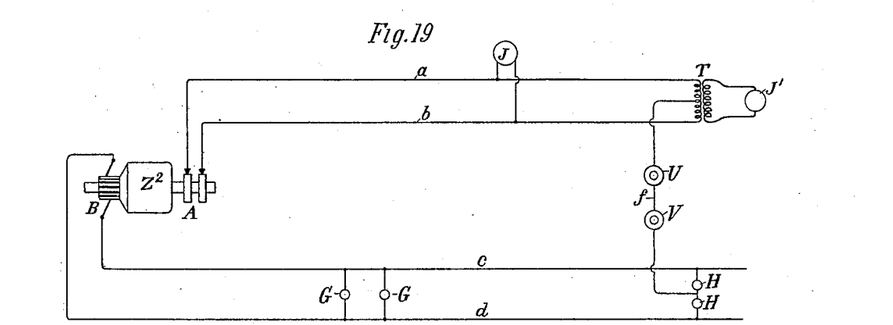

In Fig. 19 is shown an application of my invention somewhat similar to that shown in Fig. 18. In this case $Z^2$ is a direct-current generator delivering current from the commutator B to the translating devices G G, while A represents collecting-rings connected to opposite points in the winding of the generator-armature, so as to take therefrom single-phase alternating currents in a well-known manner to operate translating devices at J J'. The generator U and receiving apparatus V are included in the line $f$, whose respective terminals are connected to an intermediate point in the primary coil of transformer T and to an intermediate point between the translating devices H H. As in the arrangement described and shown in Fig. 18 the generator and receiver U V may be operated independently of either the direct or alternating current from $Z^2$.

Figure 20:
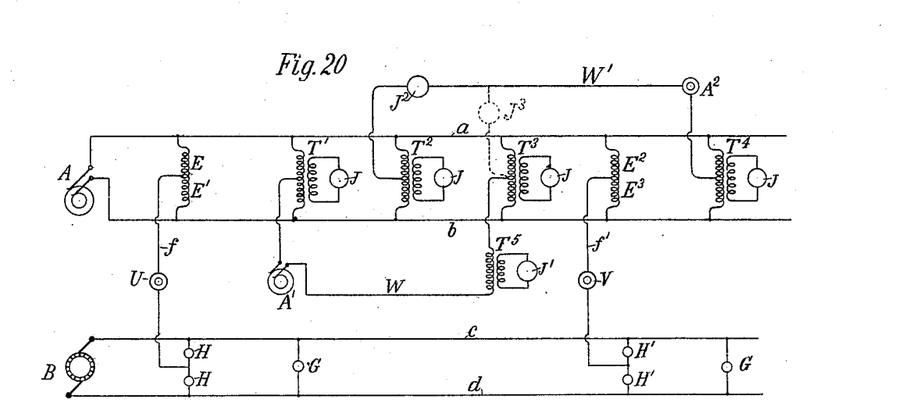
Fig. 20 illustrates the fifth portion of my invention.

Fig. 20 represents a system wherein my fundamental invention is repeatedly applied. According to my invention a second current is transmitted over the conductors of an existing system acting jointly as a single conductor. In the same manner a third and fourth and any number of currents may be transmitted.

Referring to Fig. 20, A is an alternating-current generator furnishing current to the conductors $a$ $b$ and operating the translating devices J J J J by means of transformers, as shown. A' is a second alternator connected to an intermediate point in the primary of transformer T', the circuit therefrom being completed by the conductors $a$ $b$ in parallel as a single conductor to an intermediate point in transformer $T^3$, wherefrom current is taken to the transformer $T^5$, from the secondary of which the translating device J' is operated, the circuit being completed by return-wire W to the generator A'. In a like manner the alternator A² is arranged to operate the receiving device J² through the conductors $a\ b$, acting jointly as a single conductor and the return-wire W'. The translating device J³ may be operated in parallel with J² by the connections shown by dotted lines. In this manner I have shown the transmission of alternating currents from three sources, either entirely or in part, by the same conductors $a\ b$, these alternating currents being either the same or different in phase, voltage, or frequency. It is merely an extension of my invention to transmit any number of currents in a like manner. Furthermore, the character of such currents, here described as alternating, is in no wise limited. For instance, A² may represent a source of current of any character whatsoever and J² any suitable receiving apparatus.

In Fig. 20 I have likewise shown an application of my invention as already described and shown in Fig. 18, U being a generator connected to the receiving apparatus V through the conductors $a\ b$ in parallel as an outgoing conductor and similarly through $c\ d$ in parallel as a return-conductor.

In illustrating the part of my invention shown in Figs. 18, 19, and 20, for simplicity I have shown only single-phase currents; but multiphase currents may readily be employed in a like manner, connections being made as shown in Figs. 4 to 15.

What I claim as new, and desire to secure by Letters Patent, is—

1. The combination with an electric distribution-circuit carrying a maintained current of constant potential and having its own source of current and receiver, of a second source of current and receiver adapted for currents of a different character and connected to the said circuit at points of equal potential.

2. The combination with a source of maintained current, line conductors connected thereto and energy-translating apparatus deriving maintained currents therefrom at constant potential, of a second source of current connected to said line conductors and transmitting current over said conductors acting jointly as a single conductor to suitable receiving apparatus.

3. The combination with a source of maintained current, of a distribution-circuit connected thereto, energy-translating apparatus deriving maintained currents therefrom at constant potential, and a second circuit, including a second source of current and receiving apparatus, connected to the said distribution-circuit at points of equal potential.

4. The combination with an electric distribution-circuit carrying a maintained current and having a source of current and receiver, of a second source of current and receiver adapted for currents of different character connected to the said distribution-circuit at intermediate points in coils bridging the main conductors of said circuit.

5. The combination with an alternating-current-distribution circuit carrying a maintained current and having a generator and receiver, of a second generator and receiver connected to the said alternating circuit at respective intermediate points in reactive coils bridging the main conductors of said circuit.

6. The combination with an electric circuit containing a source of current and receiving apparatus, of a two-part coil bridging the line conductors of said circuit, and a second circuit containing its own source of current and receiving apparatus, adjustably connected to a point between the two parts of the said coil.

7. The combination with an electric circuit conveying a current of one character, of a two-part coil bridging the line conductors of said circuit and a generator adapted for a current of different character adjustably connected to a point between the two parts of said coil.

8. The combination with an electric circuit and its source of current and receiving apparatus, of a two-part coil bridging the line conductors of said circuit, the two parts of said coil being of different proportions, and a second source of current connected to an intermediate point of said coil between the two parts thereof.

9. The combination with an electric circuit, having its own source of current and receiving apparatus, of a second source of current connected to said circuit and transmitting current over the line conductors thereof acting jointly as a single conductor, and means for adjusting the division of said second current between said line conductors.

10. The combination with an electric circuit containing a source of current and receiving apparatus, of a two-part coil bridging the line conductors of said circuit; a second source of current connected between the two parts of said coil and means for adjusting the relative resistance between the point of connection of said second source and the respective line conductors of the said circuit.

11. The combination with an electric circuit containing a source of current and receiving apparatus, of a second circuit containing a second source of current and an appropriate receiver connected to an intermediate point in a coil bridging the conductors of the first circuit, and means for adjusting the potential of said intermediate point.

12. The combination with an alternating electric circuit having its own generating and receiving apparatus, of an inductive coil bridging the line conductors of said circuit, a second source of current connected to an intermediate part of said coil and means for adjusting the inductive reaction between the point of connection of said source and the respective line conductors of the said circuits.

13. The combination with a multiphase, alternating circuit having its own generating and receiving apparatus, of a second source of current connected to a point in a multiphase coil on said circuit, and receiving apparatus corresponding to the said second source of current connected in like manner to an intermediate point in a second multiphase coil connected to the said circuit.

14. The combination with a system of multiphase-current distribution and its source of electromotive force, of a second source of electromotive force connected to an intermediate neutral point of said system, and receiving apparatus connected to a second neutral point of said system.

15. The combination with a multiphase, alternating circuit having its own generating and receiving apparatus, of a second source of current connected symmetrically with respect to magnetizing action to a multiphase coil in said circuit, and receiving apparatus corresponding to the said second source of current connected in like manner to a symmetrical point of a second multiphase coil in said circuit.

16. The combination with a multiphase, alternating circuit, of a branching multiphase coil connected to said circuit, a second generator connected to one of the branches of said coil at a point symmetrical with respect to the magnetizing effect of the current from said second generator, and receiving apparatus corresponding to the second generator similarly connected to a second multiphase coil in said multiphase circuit.

17. The combination with an alternating multiphase circuit of a multiphase coil connected to the line conductors thereof, a second generator adjustably connected to an intermediate point in the said multiphase coils, and a receiver corresponding to said second generator connected to an intermediate point of the second multiphase coil in said circuit.

18. The combination with an alternating multiphase circuit, of a multiphase coil connected to the line conductors thereof and a second generator connected to an intermediate point in said coil through a series of differential coils for neutralizing the magnetizing effect of the current from said second generator.

19. The combination with a multiphase alternating circuit, of a multiphase coil connected to said circuit and a second generator connected to an intermediate point of a coil bridging the branches of said multiphase coil.

20. The combination with an alternating multiphase circuit, of multiphase transformer-coils consisting of two diverging branch coils and a third coil bridging between intermediate points in the said branch coils respectively.

21. The combination with an alternating multiphase circuit, of a multiphase coil consisting of two diverging branch coils and a third coil bridging between intermediate points in the branch coils respectively, and a second generator connected to an intermediate point in said bridging-coil.

22. The combination with an alternating-current circuit, of a multiphase coil connected thereto, and a second generator connected to two or more points of said coil through branch circuits of adjustable resistance.

23. The combination with an alternating multiphase circuit, of a direct-current generator connected thereto through differential coils, a multiphase motor connected to said circuit and receiving apparatus corresponding to the said second generator connected to an intermediate point in the coils of said motor.

24. The combination with an alternating-current circuit, of a source of direct current connected thereto and transmitting current over the conductors of said circuit acting jointly as a single conductor, a rotary converter deriving current from said circuit, and a connection between the direct-current end of said converter and an intermediate point in reactive coils connected to said circuit.

25. The combination with a multiphase alternating circuit, of a source of direct current connected thereto through reactive coils, a rotary converter deriving current from said circuit, and a connection between the conductors of said circuit jointly as a single conductor to one terminal of the direct-current end of said converter.

26. The combination with an alternating circuit, of a direct-current generator connected to the line conductors of said circuit through reactive coils, a rotary converter deriving current from said circuit, and a connection between one terminal of the direct-current end of said converter to said line conductors through a second set of reactive coils.

27. The combination with an alternating-current circuit, of a source of direct current connected thereto through reactive coils, a rotary converter deriving current from said circuit, and a switch for connecting the said circuit to the direct-current end of said converter temporarily.

28. The combination of an alternating-current-distributing system, a rotary converter connected thereto and a connection from the direct-current end of said converter to an intermediate point in a reactive coil connected to said system.

29. The combination of an electrodynamic translating apparatus for the generation of direct currents, alternating-current-collecting rings connected to the armature thereof, an alternating-current line-circuit connected to said collecting-rings, a transformer connected to said line-circuit, and a connection from the direct-current end of said translating apparatus to an intermediate point in the secondary of said transformer.

30. In an alternating-current system, the combination with an electrodynamic translating apparatus, of an armature with a direct-current winding and a commutator connected thereto, alternating-current-collecting rings connected to said winding and—by means of brushes and conductors—to the line-circuit of said system, and means for deriving direct current from said commutator and applying the same to an intermediate point of a reactive coil of said system.

31. The combination with a direct-current generator, of an alternating circuit forming part of an alternating distributing system connected to opposite points of its windings, a direct-current circuit derived from the commutator of the machine, and means for completing said direct-current circuit by alternating conductors of said system acting jointly as a single conductor.

32. The combination with an alternating multiphase circuit, of multiphase transformers connected thereto, a rotary converter in the secondary circuits of said transformers, and a connection from one terminal of the direct-current end of the converter to an intermediate point in one of said transformer-coils.

33. The combination with a multiphase circuit, of a rotary converter deriving current therefrom, and means for connecting the conductors of said circuit jointly as a single conductor to one terminal of the direct-current end of said converter.

34. The combination with a three-phase alternating system, of transformers connected thereto, a rotary converter connected to the secondaries of said transformers and a connection from one terminal of the direct-current end of the converter to an intermediate point in inductive coils connected to conductors of said system.

35. The combination with an alternating-current system, of a direct-current generator connected to the line conductors thereof through differential coils, a transformer connected to said line conductors, a rotary converter connected to the secondary circuit of said transformer, means for temporarily connecting one terminal of the direct-current end of said converter to an intermediate point in reactive coils connected to said line conductors, and means for also connecting the direct-current end of the converter to a secondary circuit of said system through differential coils.

36. The combination with a direct-current generator, of an alternating circuit connected to opposite points of its winding, a direct-current circuit derived from the commutator of the machine, a third circuit connected at one end to the said alternating circuit through differential apparatus and at the other end to the said direct-current circuit at an intermediate point in translating apparatus, and generating and receiving apparatus contained in said third circuit.

37. The combination with an alternating and a direct current circuit, each with its own translating apparatus, of a third circuit—with its independent generator and receiver—completed in part by the alternating conductors acting jointly as a single conductor and in part by the direct-current conductors acting similarly as a single conductor.

38. The combination with an electric circuit and its generating and receiving apparatus, of a plurality of independent circuits, each with its own source of current and receiving apparatus and each completed in part by the conductors of the original circuit acting jointly as a single conductor.

39. In a system for the joint distribution of alternating and direct current, the combination with devices for adjusting either current with relation to a circuit carrying the other current; of a switch for short-circuiting said devices.

40. The combination with an alternating multiphase circuit, of a multiphase coil consisting of two diverging branches and a third coil bridging between respective intermediate points so located in said branch coils as to divide each branch coil into two portions, of which the greater comprises twice as many turns as the lesser.

41. The combination with a source of maintained current, line conductors connected thereto and energy-translating apparatus deriving maintained currents therefrom at constant potential, of a second source of current connected to said line conductors and transmitting current at constant potential over said conductors acting jointly as a single conductor to suitable receiving apparatus.

42. The combination with a source of maintained constant electromotive force and line conductors connected thereto, of a second source of current connected to said line conductors and transmitting current of unchanging polarity over said conductors acting jointly as a single conductor to suitable receiving apparatus.

In witness whereof I have hereunto set my hand, before two subscribing witnesses, the 23d day of January, 1900.

FREDERICK BEDELL.

Witnesses:
E. L. WILLIAMS,
HORACE MACK.